United States Patent [19]
Fujiwara et al.

[11] Patent Number: 4,949,931
[45] Date of Patent: Aug. 21, 1990

[54] APPARATUS FOR MOUNTING AND MODIFYING THE ARRANGEMENT OF SEATS IN A VEHICLE

[75] Inventors: Mikio Fujiwara; Hideki Irie; Minoru Komohara, all of Ayase, Japan

[73] Assignee: Ikeda Bussan Company, Ltd., Kanagawa, Japan

[21] Appl. No.: 384,400

[22] Filed: Jul. 24, 1989

[30] Foreign Application Priority Data

Sep. 17, 1988 [JP] Japan ................. 63-233098

[51] Int. Cl.$^5$ ........................... F16M 13/00
[52] U.S. Cl. ..................... 248/429; 248/430
[58] Field of Search ............ 248/429, 430, 424, 373; 297/243; 296/65.1

[56] References Cited

U.S. PATENT DOCUMENTS

| | | | |
|---|---|---|---|
| 3,381,927 | 5/1968 | Stamates | 248/429 |
| 4,515,404 | 5/1985 | Nishimura et al. | 248/429 X |
| 4,516,811 | 5/1985 | Akiyama et al. | 248/429 X |
| 4,530,540 | 7/1985 | Hayden et al. | 248/430 X |
| 4,733,845 | 3/1988 | Maiwald | 248/429 |
| 4,742,983 | 5/1988 | Nihei | 248/429 |
| 4,781,353 | 11/1988 | Nishino | 248/424 X |

Primary Examiner—Ramon O. Ramirez
Attorney, Agent, or Firm—Brooks & Kushman

[57] ABSTRACT

A locking slide apparatus (10) for mounting a slidable seat (3) in a vehicle and for facilitating the rearrangement of tandemly disposed seats (1, 2 and 3) is disclosed that has an elongated stationary rail (7) securable to the vehicle floor (4), a slide mechanism (12) adapted to support the seat and to slide along the rail, a lock mechanism (33) to secure the slide mechanism to the rail at selected positions therealong, an operating mechanism (34) to operate the lock mechanism, a seat position sensor mechanism (94) to sense the location of the seat along the rail, and an interlock mechanism (62) to prevent the operation of the lock mechanism if a passenger is occupying the seat.

18 Claims, 5 Drawing Sheets

APPARATUS FOR MOUNTING AND MODIFYING THE ARRANGEMENT OF SEATS IN A VEHICLE

TECHNICAL FIELD

The present invention relates to a locking slide apparatus for mounting a seat in a vehicle.

BACKGROUND ART

Conventional, single-compartment automotive vans or the like are commonly used to carry passengers and to carry material or combinations of the two. To facilitate this use, such vehicles have been fitted with seats that can be repositioned or removed as required to provide the most useful interior configuration.

While these innovations function with a certain degree of efficacy, removing seats requires substantial effort; and the space gained by repositioning seats mounted according to present technology represents but an inefficient compromise in load-carrying capacity. In addition, a danger exists that passengers seated on slidable seats may become sandwiched between them and other seats if the slide locking mechanisms are inadvertently operated while the vehicles in which they are mounted are decelerating.

DISCLOSURE OF THE INVENTION

An object of the present invention is to provide an improved apparatus for mounting and modifying the arrangement of seats in a vehicle so that optimum combinations of space, convenience and safety can be obtained.

In carrying out the foregoing and other objects, the present invention provides a locking slide apparatus for mounting a longitudinally slidable seat having a seat cushion frame, tiltable about a lateral axis, and a seat back frame. Both are mounted on a seat support and respectively support a seat cushion and a seat back. The present invention also facilitates the rearrangement of seats in a vehicle having mounted respectively in tandem therein a nonremovable front seat, a removable middle seat and a slidable rear seat, the slidable rear seat being lockably positionable in a plurality of seat positions.

The locking slide apparatus includes an elongated stationary rail that is securable to a vehicle floor, a slide mechanism adapted to support the slidable rear seat and to be supported by and to slide longitudinally along the rail, a lock mechanism to secure the slide mechanism to the rail at selected positions therealong, an operating mechanism to operate the lock mechanism, a seat position sensor mechanism to sense the location of the slidable rear seat along the rail, and an interlock mechanism to prevent the operation of the lock mechanism if a passenger is occupying the seat.

The stationary rail includes an upper horizontal side, a lower horizontal side and two vertical sides defining a substantially rectangular cross section. The upper horizontal side has a slot longitudinally disposed therein that extends along at least a portion of the length thereof. The upper horizontal side also has lock holes extending therethrough at each of the seat positions, and the lower horizontal side has a seat position sensor hole extending therethrough at each of the seat positions.

The slide mechanism includes an elongated horizontal slide member having two vertical slide members depending therefrom along a substantial portion of a longitudinal border thereof. The vertical slide members extend downwardly from the horizontal slide member through the slot in the upper horizontal side of the stationary rail. Each of the vertical slide members supports a laterally aligned shaft upon which is rotatably mounted a roller on each side of the vertical slide member. The rollers are disposed between the upper horizontal side and the lower horizontal side of the stationary rail.

The lock mechanism includes a slide lock having a substantially I-shaped cross section defined by a vertical web connected to and extending between a horizontal upper flange and a horizontal lower flange. The horizontal lower flange has one or more lock pawls upwardly and vertically disposed thereon distal from said web, and its lateral extremities support upwardly and vertically disposed lateral slide lock guides. The lock pawl is resiliently biased in an upward direction by a substantially helical lock spring disposed between the upper flange of the slide lock and the horizontal slide member of the slide mechanism.

The operating mechanism includes an operating lever, a first interlocking member, an operating cam and a connecting member. The operating lever and the first interlocking member are both secured to an operating shaft for rotation therewith, and the operating cam is secured to a camshaft for rotation therewith. The connecting member extends between and is connected to the first interlocking member and the operating cam.

The seat position sensor mechanism includes a seat position sensor, having a vertical member and an upper horizontal flange, and a sensor cam. The sensor cam is secured to a first swivel shaft for rotation therewith. The horizontal flange of the seat position sensor is resiliently biased upwardly against the sensor cam, which, when rotated by the first swivel shaft, urges the seat position sensor downward into a seat position sensor hole located in the lower horizontal side of the stationary rail at each seat position. A hand lever is also secured to the first swivel shaft to provide a means for manually rotating the shaft.

The interlock mechanism includes a second interlocking member, an operating rod and a catch bracket. The second interlocking member is secured to and is rotatable with a second swivel shaft and has a projecting stop engageable with a corresponding detent in the first interlocking member secured to the operating shaft. An operating rod is also secured to the second interlocking member, and the catch bracket is disposed on a rear portion of the seat cushion frame so that, when the latter is tilted about its lateral axis, the catch bracket is pushed against the operating rod. A seat catch is mounted on a forward lateral portion of the seat cushion frame; and a seat latch hook is mounted on an upper forward portion of the seat support to retain the seat cushion frame in a horizontal position.

With the slidable rear seat disposed at one of the seat positions, the seat latch hook can be disengaged from the seat catch; and the seat cushion frame can be tilted about its lateral axis to a substantially vertical position. When this is done, the catch bracket mounted on the rear portion of the seat cushion frame strikes the operating rod. The operating rod is displaced, rotating the projecting stop of the second interlocking member out of engagement with the corresponding detent in the first interlocking member, freeing the latter member for rotation about the operating shaft. As the operating rod is displaced, the catch secured to the catch bracket is engaged by the latch hook secured to the first swivel shaft, thereby securing the seat cushion frame in its vertical position.

The operating lever can then be rotated, in turn rotating the first interlocking member and the operating cam via the connecting rod connected therebetween. The rotating operating cam forces the slide lock in a downward direction, thereby withdrawing the lock pawls from the lock holes in the stationary rail. With the lock pawls withdrawn, the slide mechanism and the attached slidable rear seat can be longitudinally repositioned along the stationary rail. Once the seat is in a desired position, the operating lever can be released, allowing the lock spring to force the lock pawls into respective lock holes, thereby denying the slide mechanism any further travel along the stationary rail.

Once the lock pawls have been inserted into respective lock holes, inertial forces accompanying a collision and translated through an effective lever formed by an angled seat frame and slide mechanism will tend to force the lock pawls upward and into the lock holes, thereby reinforcing the engagement of the slide lock. Also, due to the configuration of the slide mechanism and the lock mechanism, the present invention provides an improved minimization of undesirable longitudinal and lateral movement thereof with respect to the stationary rail.

With the slidable rear seat at a seat position, the hand lever can be rotated. This rotates the first swivel shaft and, with it, the seat position sensor cam. The seat position sensor cam, due to its eccentric peripheral configuration, urges the seat position sensor downward into an associated seat position sensor hole in the stationary rail. As the first swivel shaft is rotated, the latch hook secured thereto is also rotated such that it releases the catch, thereby permitting the seat cushion frame to be rotated to a horizontal position to seat a passenger.

If the slidable rear seat is not at a seat position, the seat position sensor will not be aligned with a seat position sensor hole. The seat position sensor will not move downward, and the seat position sensor cam will not be permitted to rotate. The first swivel shaft to which the seat position sensor cam is secured will also not be permitted to rotate, nor will the latch hook. The latch hook will thus not release the catch, and the seat cushion frame will not be permitted to be rotated to a horizontal position to seat a passenger.

With the construction described by the foregoing, four distinct seating arrangements are possible. In a first arrangement, mounted respectively in tandem would be a nonremovable front seat, a removable middle seat and the slidable rear seat. In a second arrangement, the seat cushion frame of the slidable rear seat has been rotated to a vertical position; and the seat has been moved along the stationary rail to, and locked in, a position immediately behind the middle removable seat. In a third arrangement, the removable middle seat has been removed; and the slidable rear seat has been moved along the stationary rail to, and locked in, the position normally occupied by the removable middle seat. Once in this position, the seat cushion frame of the slidable rear seat can be returned to its horizontal position to seat a passenger. In a fourth arrangement, the seat cushion frame of the slidable rear seat has been rotated to a vertical position; and the seat has been moved along the stationary rail to, and locked in, a position immediately behind the nonremovable front seat.

The objects, features and advantages of the present invention are readily apparent from the following detailed description of the best mode for carrying out the invention when considered in connection with the accompanying drawings thereof in which like reference characters indicate corresponding parts in all the views.

BEST MODE FOR CARRYING OUT THE INVENTION

With reference to FIGS. 1A through 1D of the drawings, four possible arrangements for seats in a vehicle employing the locking slide apparatus 10 of the present invention are illustrated. In a first arrangement shown in mounted FIG. 1A, mounted respectively in tandem is a nonremovable front seat, a removable middle seat and a slidable rear seat. In a second arrangement shown in FIG. 1B, the seat cushion frame of the slidable rear seat has been tilted to a vertical position; and the seat has been moved along the stationary rail to, and locked in, a position immediately behind the middle removable seat.

Figure 1A:
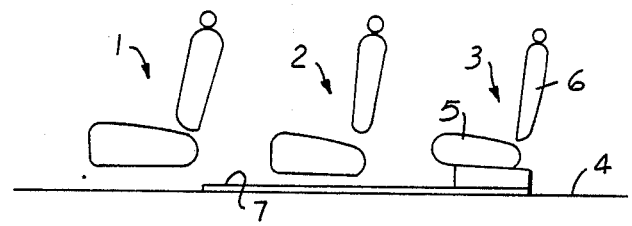
FIGS. 1A through 1D are side views of four possible arrangements for seats in a vehicle employing the locking slide mechanism of the present invention.
Figure 1B:
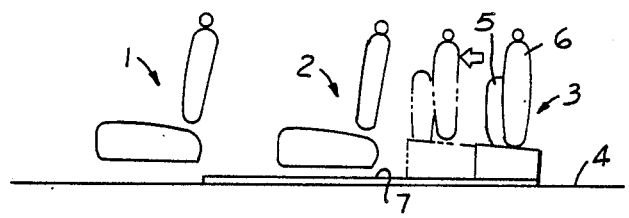
Figure 1C:
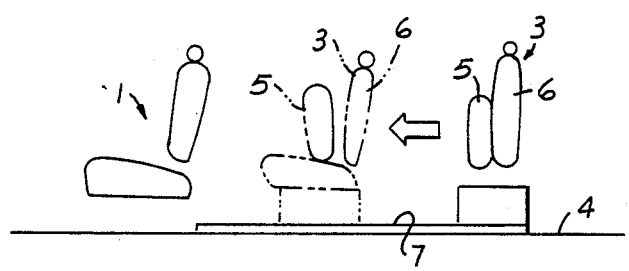
Figure 1D:
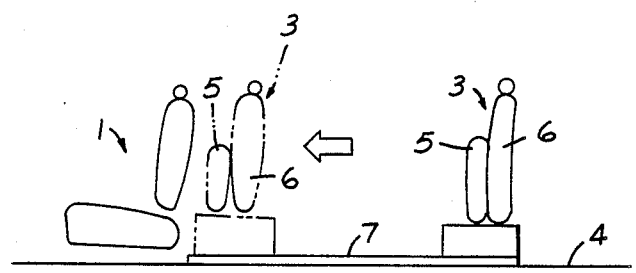

In a third arrangement shown by FIG. 1C, the removable middle seat has been removed; and the slidable rear seat has been moved along the stationary rail to, and locked in, the position normally occupied by the removable middle seat. Once in this position, the seat cushion frame of the slidable rear seat can be returned to its horizontal position to seat a passenger. In a fourth arrangement shown in FIG. 1D, the seat cushion frame of the slidable rear seat has been tilted to a vertical position; and the seat has been moved along the stationary rail to, and locked in, a position immediately behind the nonremovable front seat.

Figure 2:
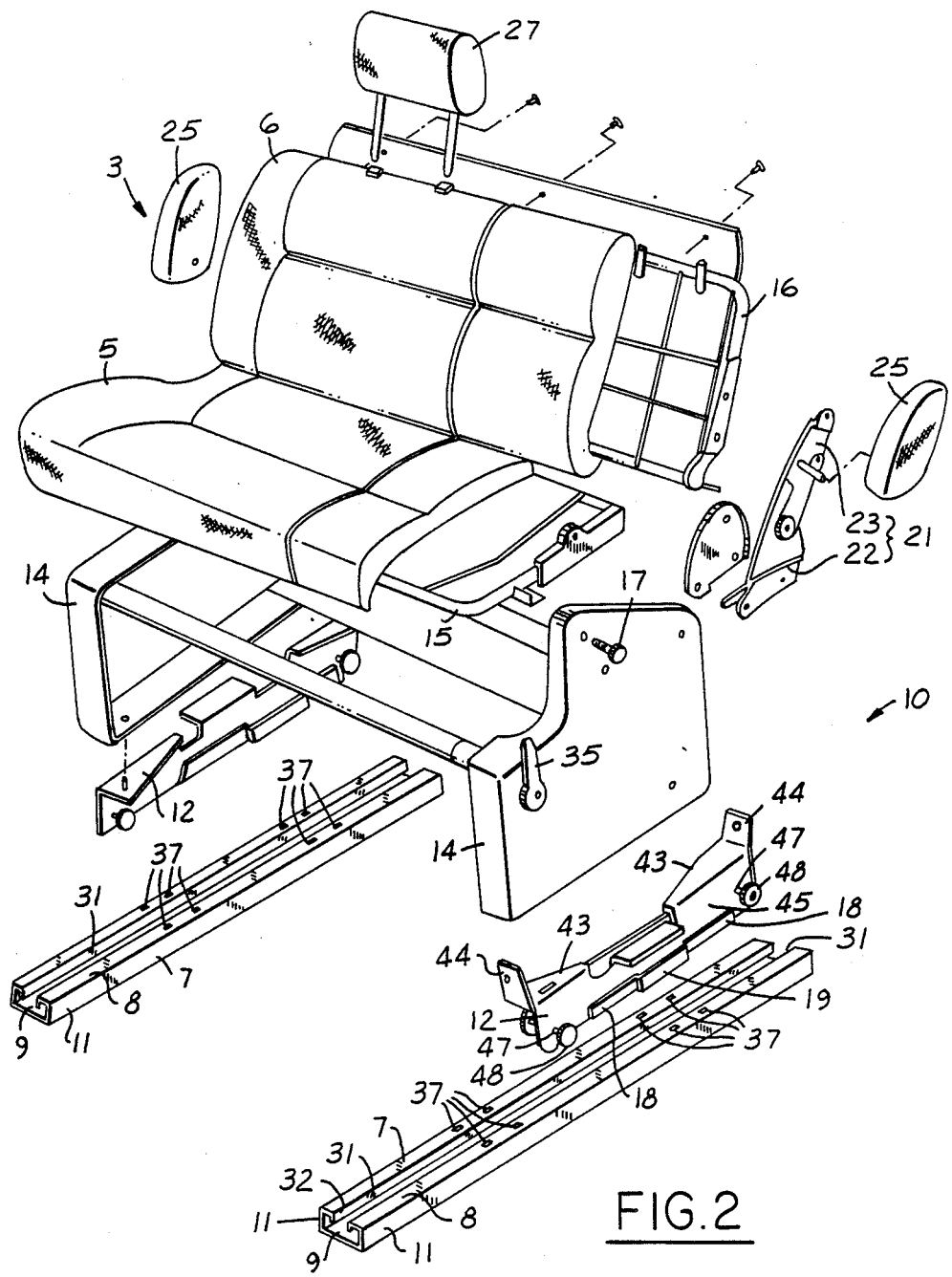
FIG. 2 is an exploded perspective view illustrating parts included in the locking slide mechanism and a seat mounted thereon.
Figure 3:
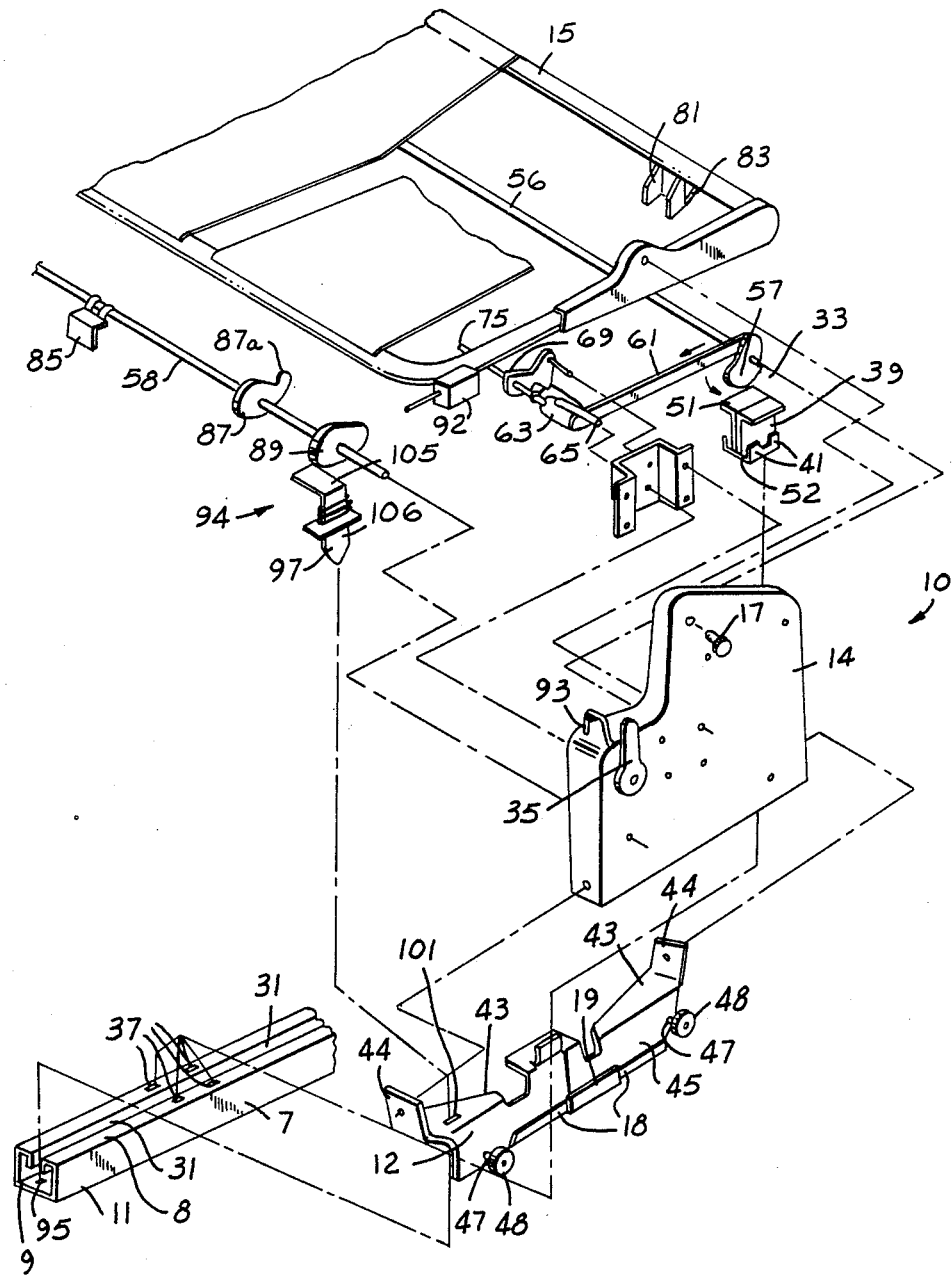
FIG. 3 is a fragmentary view similar to, and showing more detail of a selected portion of, FIG. 2.
Figure 4:
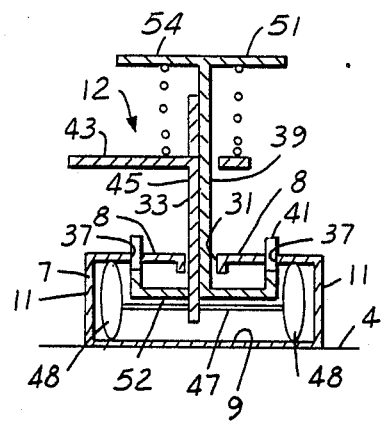
FIG. 4 is a central sectional view of the slide and lock mechanisms and the stationary rail.

As illustrated in FIGS. 2, 3 and 4, the present invention provides a locking slide apparatus, generally indicated by reference numeral 10, for mounting a longitudinally slidable rear seat 3 having a seat cushion frame 15 and a seat back frame 16. The seat cushion frame 15 is tiltably secured to a seat support 14 with a laterally aligned seat mounting pivot pin 17. The seat back frame 16 is secured to an arm 23 of a reclining mechanism 21. The arm is partially rotatable about a base 22 of the reclining mechanism 21, and the base 22 is secured to the seat support 14. An arm rest 25 is pivotably secured to the arm 23 of the reclining mechanism 21, and a head rest 27 is adjustably mounted atop the seat back 6.

The locking slide apparatus (10) includes an elongated stationary rail 7 that is securable to a vehicle floor 4 (FIG. 1), a slide mechanism 12 adapted to support the slidable rear seat 3 and to be supported by and to slide longitudinally along the rail 7, a lock mechanism 33 to secure the slide mechanism to the rail at selected positions therealong, an operating mechanism 34 to operate the lock mechanism 33, a seat position sensor mechanism 94 to sense the location of the seat 3 along the rail 7, and an interlock mechanism 62 to prevent the operation of the lock mechanism 33 if a passenger is occupying the seat 3.

The stationary rail 7 includes an upper horizontal side 8, a lower horizontal side 9 and two vertical sides 11 defining a substantially rectangular cross section. The upper horizontal side 8 has a slot 31 longitudinally disposed therein that extends along at least a portion of its length. An elongated rail guide 32 depends from the upper horizontal side s of the stationary rail 7 and extends along each longitudinal border of the slot 31. The rail guides 32 strengthen the rail 7 and assist in guiding the longitudinal movement of the slide mechanism 12 and minimize the lateral movement thereof. The upper horizontal side 8 also has lock holes 37 extending therethrough at each of the seat positions. The lower horizontal side 9 has a seat position sensor hole 95 extending therethrough at each of the seat positions. As is well known by anyone skilled in the art, the upper horizontal side 8, the lower horizontal side 9, and the two vertical sides 11 and the two elongated rail guides 32 of the stationary rail 7 can be formed of one continuous piece of suitable material such as metal or plastic.

The slide mechanism 12 includes an elongated horizontal slide member 43 having two vertical slide members 45 depending therefrom along a substantial portion of a longitudinal border thereof, there being a space defined between the adjacent ends of the two vertical slide members 45. As is also well known by anyone skilled in the art, the horizontal slide member 43 and the two vertical slide members 45 can be formed of one continuous piece of suitable material such as metal or plastic.

The vertical slide members 45 extend downwardly from the horizontal slide member 43 through the slot 31 in the upper horizontal side 8 of the stationary rail 7. Each of the vertical slide members 45 supports a laterally aligned shaft 47 upon which is rotatably mounted a roller 48 on each side of the vertical slide member 45. The rollers 48 are disposed between the upper horizontal side 8 and the lower horizontal side 9 of the stationary rail 7 and outside the rail guides 32.

A guide plate 46 is secured to the horizontal slide member 43 proximate the space defined between the adjacent ends of the two vertical slide members 45. The guide plate 46 is substantially C-shaped and cooperates with the horizontal slide member 43 to form a guide slot for the lock mechanism 33. Seat support mounting brackets 44 are also connected to the horizontal slide member 43 of the slide mechanism 12 to secure the seat support 14 thereto.

The lock mechanism, generally indicated by reference numeral 33, includes a slide lock 39 having a substantially I-shaped cross section defined by a vertical web connected to and extending between a horizontal upper flange 51 and a generally rectangularly shaped horizontal lower flange 52. The horizontal lower flange 52 extends laterally through the space defined between the adjacent ends of the two vertical slide members 45.

Lateral slide lock guides 42 are upwardly and vertically disposed on each lateral border of the horizontal lower flange 52, and a lock pawl 41 is disposed proximate to, and extends upwardly and vertically from, each longitudinal end of each lateral slide lock guide 42. The lock pawls 41 are resiliently biased in an upward direction by a substantially helical lock spring 54 disposed between the upper flange 51 of the slide lock and the horizontal slide member 43 of the slide mechanism 12, thereby facilitating their insertion and retention in respective lock holes 37 in the upper horizontal slide member 43 of the stationary rail 7.

Each of a pair of U-shaped side channels 18 is connected, along its internal nadir line, to one of the vertical slide members 45, along its lower edge. A U-shaped central channel 19 envelops at least a portion of, and is connected to, each of said side channels 18 such that the lower flange 52 of the slide lock 39 is slidably enveloped within a central portion of the central channel 19 to minimize any lateral and angular movement of the slide lock 39. The disposition of the slide lock 39 between the two side channels 18 minimizes any longitudinal movement of the slide lock 39.

Figure 5:
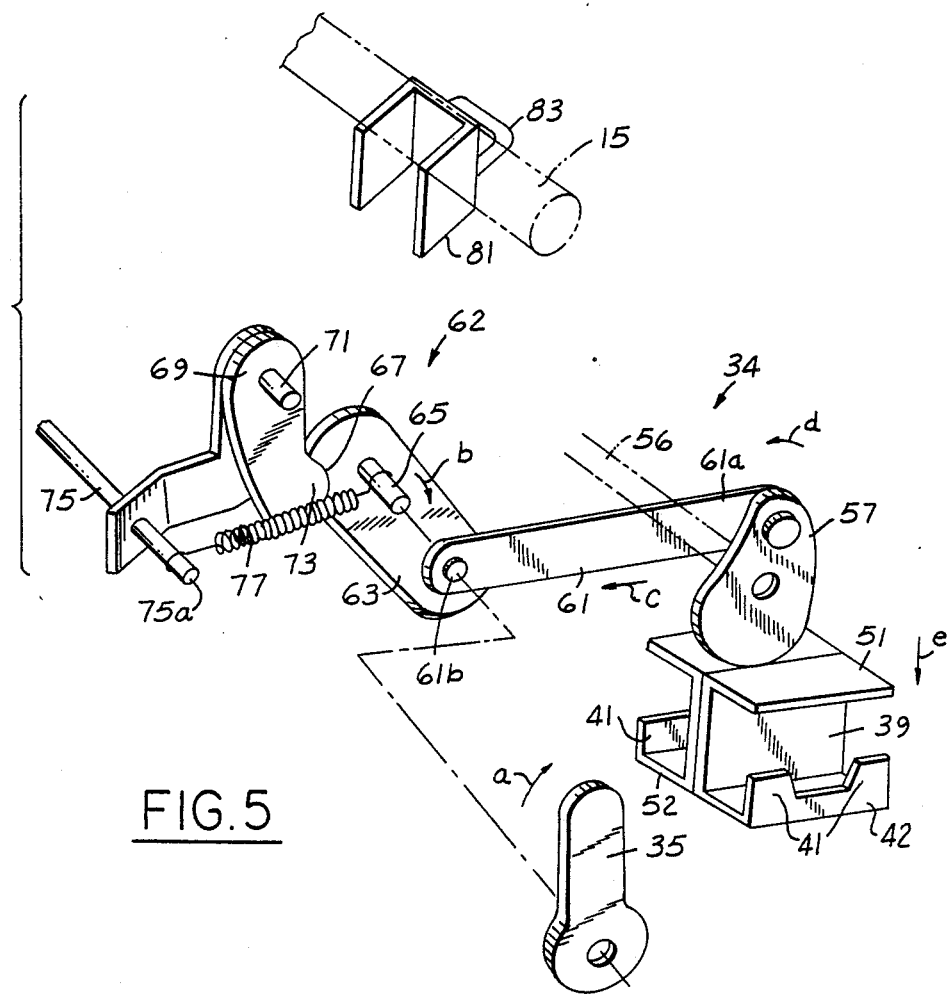
FIG. 5 is an exploded perspective view illustrating parts included in the operating and interlock mechanisms.

As shown in FIGS. 3 and 5, the operating mechanism 34 includes an operating lever 35, a first interlocking member 63, an operating cam 57 and a connecting member 61. The operating lever 35 and the first interlocking member 63 are both secured to an operating shaft 65 for rotation therewith, and the operating cam 57 is secured to a camshaft 56 for rotation therewith. The connecting member 61 extends between and is connected to the first interlocking member 63 and the operating cam 57.

Figure 6:
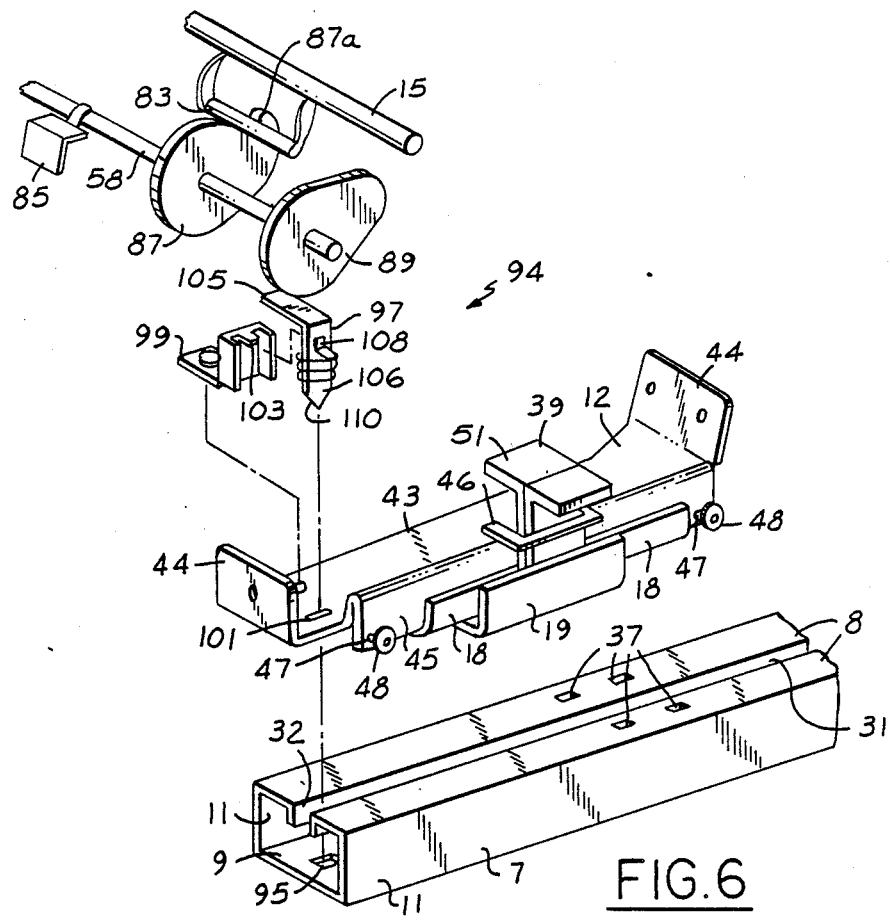
FIG. 6 is an exploded perspective view illustrating parts included in the slide, lock and seat position sensor mechanisms.
Figure 7:
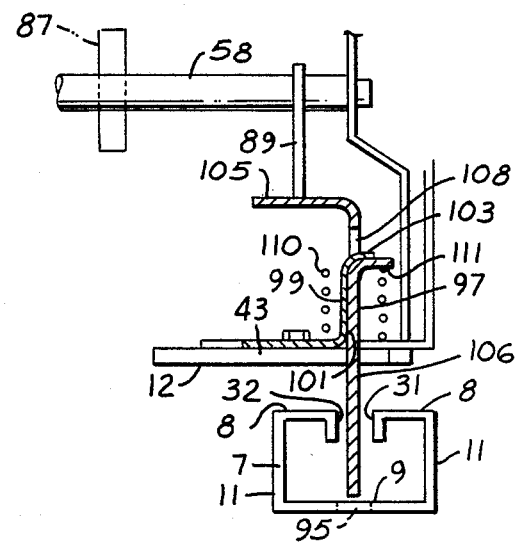
FIG. 7 is a fragmentary view, partly in section, illustrating parts included in the slide and seat position sensor mechanisms.

As displayed in FIGS. 3, 6 and 7, the seat position sensor mechanism 94 includes a seat position sensor 97, having a vertical member 106 and an upper horizontal flange 105, and a sensor cam 89. The sensor cam 89 is secured to a first swivel shaft 58 for rotation therewith. The horizontal flange 105 of the seat position sensor 97 is resiliently biased upwardly against the sensor cam, which, when rotated by the first swivel shaft 58, urges the seat position sensor downward into a seat position sensor hole 95 located in the lower horizontal side 9 of the stationary rail 7 at each seat position. A hand lever 85 is also secured to the first swivel shaft 58 to provide a means for manually rotating the shaft 58.

The interlock mechanism 62 includes a second interlocking member 69, an operating rod 75 and a catch bracket 81. The second interlocking member 69 is secured to and is rotatable with a second swivel shaft 71 and has a projecting stop 73 engageable with a corresponding detent 67 in the first interlocking member 63 secured to the operating shaft 65. The operating rod 75 is also secured to the second interlocking member 69, and the catch bracket 81 is disposed on a rear portion of the seat cushion frame 15 so that, when the latter is tilted about its lateral axis, the catch bracket 81 is pushed against the operating rod 75. A seat catch 92 is mounted on a forward lateral portion of the seat cushion frame 15; and a seat latch hook 93 is mounted on an upper forward portion of the seat support 14 to retain the seat cushion frame 15 in a horizontal position.

With the slidable rear seat disposed at one of the seat positions, the seat latch hook 93 can be disengaged from the seat catch 92; and the seat cushion frame 15 can be tilted about its lateral axis to a substantially vertical position. When this is done, the catch bracket 81 mounted on the rear portion of the seat cushion frame 15 strikes the operating rod 75. The operating rod 75 is displaced, rotating the projecting stop 73 of the second interlocking member 69 out of engagement with the corresponding detent 67 in the first interlocking member 63, freeing the latter member for rotation about the operating shaft 65. As the operating rod 75 is displaced, the catch 83 secured to the catch bracket 81 is engaged by the latch hook 87 secured to the first swivel shaft 58, thereby securing the seat cushion frame 15 in its vertical position.

The operating lever 35 can then be rotated in a direction indicated by arrow a (FIG. 5), in turn rotating the first interlocking member 63 in a direction indicated by arrow b. As the first interlocking member 63 rotates, it pulls the connecting rod 61 connected thereto in a direction indicated by arrow c. This rotates the operating cam 57 in a direction indicated by arrow d. The eccentric periphery of the rotating operating cam 57 forces the slide lock 39 in a downward direction, thereby withdrawing the lock pawls 41 from the lock holes 37 in the stationary rail 7. With the lock pawls 41 withdrawn, the slide mechanism 12 and the attached seat can be longitudinally repositioned along the stationary rail 7. Once the slidable rear seat is in a desired position, the operating lever 35 can be released, allowing the lock spring 54 to force the lock pawls 41 into respective lock holes 37, thereby denying the slide mechanism 12 any further travel along the stationary rail 7.

With the slidable rear seat 3 at a seat position, the hand lever can be rotated 85. This rotates the first swivel shaft 58 and, with it, the seat position sensor cam 89. The seat position sensor cam 89, due to its eccentric peripheral configuration, urges the seat position sensor 97 downward into an associated seat position sensor hole 95 in the stationary rail 7. As the first swivel shaft 58 is rotated, the latch hook 87 secured thereto is also rotated such that it releases the catch 83, thereby permitting the seat cushion frame 15 to be rotated to a horizontal position to seat a passenger.

If the slidable rear seat 3 is not at a seat position, the seat position sensor 97 will not be aligned with a seat position sensor hole 95. The seat position sensor 97 will not move downward, and the seat position sensor cam 89 will not be permitted to rotate. The first swivel shaft 58, to which the seat position sensor cam 89 is secured, will also not be permitted to rotate, nor will the latch hook 87. The latch hook 87 will thus not release the catch 83, and the seat cushion frame 15 will not be permitted to rotate to a horizontal position to seat a passenger.

With the construction described by the foregoing, once the lock pawls 41 have been inserted into respective lock holes 37, inertial forces accompanying a collision and translated through the effective lever created by the angled seat frame and slide mechanism 12 will tend to force the lock pawls 41 upward and into the lock holes 37, thereby constructively reinforcing the engagement of the slide lock 39. Also, due to the configuration of the slide mechanism 12 and the lock mechanism 33, the present invention provides an improved minimization of undesirable longitudinal and lateral movement of the seat with respect to the stationary rail 7. Unwanted longitudinal movement of the lower flange 52 of the slide lock 39 is minimized by the restricting proximity of the side channels 18, and unwanted lateral movement is minimized by the restricting envelopment of the lower flange 52 by the central channel 19.

While the best mode for carrying out the invention has been described in detail, those familiar with the art to which this invention relates will recognize various alternative designs and embodiments for practicing the invention as disclosed by the following claims.

What is claimed is:

1. A locking slide apparatus for mounting one side of a longitudinally slidable seat having a seat cushion frame tiltable about a lateral axis and a seat back frame both mounted on a seat support and respectively supporting a seat cushion and a seat back and for facilitating the rearrangement of seats in a vehicle having mounted respectively in tandem therein a nonremovable seat, a removable seat and the slidable seat, the slidable seat being lockably positionable at a plurality of seat positions, the locking slide apparatus comprising:

an elongated stationary rail securable to a vehicle floor and extending rearwardly from a location behind the nonremovable seat, beneath the removable seat, and to a location beneath the slidable seat, said stationary rail having an upper horizontal side and a lower horizontal side connected by at least one vertical side, said upper horizontal side having at least one lock hole extending vertically therethrough at each of the seat positions;

a slide mechanism supported by and longitudinally slidable along said stationary rail, said slide mechanism being adapted to support the slidable seat thereon;

a lock mechanism having a vertical member supported by and vertically slidable along said slide mechanism, a horizontal lower flange connected to said vertical member, and at least one lock pawl connected to and extending vertically upward from said lower flange to be inserted upwardly into a vertical lock hole in said upper horizontal side of said stationary rail to prevent said slide mechanism from sliding along said stationary rail;

biasing means for resiliently biasing said lock pawl into a vertical lock hole in said upper horizontal side of said stationary rail; and operating means for operating said lock mechanism to withdraw said lock pawl from the lock hole.

2. A locking slide apparatus according to claim 1, wherein said operating means includes:

an operating shaft mounting bracket connected to the seat support;

an operating shaft rotatably supported by said operating shaft mounting bracket and extending laterally therethrough;

a cam shaft rotatably supported by the seat support and extending parallel to and spaced from said operating shaft;

an operating cam having a lever end and an eccentric end and being secured at a substantially central point thereof to said cam shaft for rotation therewith;

a first interlocking member having a first end and a second end and being secured at said first end thereof to said operating shaft for rotation therewith, said first end of said first interlocking member having a detent formed therein;

a connecting member extending between and being pivotally connected to said second end of said first interlocking member and said lever end of said cam; and an operating lever connected to said operating shaft to rotate said operating shaft in response to a rotation of said operating lever.

3. A locking slide apparatus according to claim 2, further including:

an elongated stationary rail securable to a vehicle floor and extending rearwardly from a location behind the nonremovable seat, beneath the removable seat, and to a location beneath the slidable seat, said stationary rail having an upper horizontal side and a lower horizontal side connected by at least one vertical side, said upper horizontal side having at least one lock hole extending vertically therethrough at each of the seat positions, said lower horizontal side having a seat position sensor hole extending vertically therethrough at each of the seat positions;

a first swivel shaft rotatably supported by the seat support and extending parallel to and spaced from said operating shaft;

a second swivel shaft rotatably supported by said operating shaft mounting bracket and extending parallel to and spaced from said operating shaft;

a second interlocking member having a generally Y-shaped configuration including first, second and third ends and being secured at said first end thereof to said second swivel shaft for rotation therewith, said second end of said second interlocking member having a projecting stop formed thereon to engage said detent in said first end of said first interlocking member;

an operating rod extending through and connected to said third end of said second interlocking member, said operating rod extending parallel to and spaced from said operating shaft;

a tension spring extending between and connected to said operating rod and said operating shaft to resiliently urge said projecting stop of said second interlocking member into effective engagement with said detent of said first interlocking member to prevent rotation of said first interlocking member in response to a rotation of said operating lever;

a catch bracket mounted on a rear portion of the seat cushion frame;

a catch secured to said catch bracket;

a latch hook secured to said first swivel shaft for rotation therewith to engage said catch when the seat frame is tilted;

a hand lever secured to said first swivel shaft to rotate said first swivel shaft in response to a rotation of said hand lever to disengage said latch hook from said catch;

a seat position sensor cam secured to said first swivel shaft for rotation therewith;

a seat position sensor mounting bracket secured to said slide mechanism;

a seat position sensor having a vertical member supported by and vertically slidable along said seat position sensor mounting bracket, said seat position sensor having an upper horizontal flange positioned to effectively engage said seat position sensor cam, said vertical member of said seat position sensor being downwardly insertable into the seat position sensor hole located at each seat position, said seat position sensor, when not inserted in a seat position sensor hole, preventing said seat position sensor cam from being rotated in response to an attempted rotation of said hand lever and preventing said latch hook from being disengaged from said catch; and a helical compression spring disposed between said upper horizontal flange of said seat position sensor and said slide mechanism to resiliently urge said upper horizontal flange upwardly against said seat position sensor cam and to urge said vertical member of said seat position sensor upwardly away from a sensor hole.

4. A locking slide apparatus according to claim 3, further including:

a seat catch mounted on a forward, lateral portion of the seat cushion frame; and a seat latch hook connected to said operating lever to engage said seat catch and retain the seat cushion frame in a horizontal position.

5. A locking slide apparatus according to claim 3, wherein said stationary rail includes an upper horizontal side, a lower horizontal side and two vertical sides defining a substantially rectangular cross section, said upper horizontal side having a slot longitudinally disposed therein and extending along at least a portion of the length thereof, said upper horizontal side further having a plurality of lock holes aligned parallel to and along at least one side of the slot at each of the seat positions, said lower horizontal side having a seat position sensor hole extending vertically therethrough at each of the seat positions.

6. A locking slide apparatus according to claim 5, wherein said upper horizontal side of stationary rail has a plurality of lock holes aligned parallel to and along both sides of the slot disposed therein at each of the seat position.

7. A locking slide apparatus according to claim 5, wherein said slide mechanism includes an elongated horizontal slide member, said horizontal slide member having two vertical slide members depending therefrom along a substantial portion of a longitudinal border thereof, said vertical slide members extending downwardly from said horizontal slide member through said slot in said upper horizontal side of said stationary rail, each of said vertical slide members supporting a horizontally aligned shaft upon which is rotatably mounted a roller on each side of said vertical slide member, said rollers being rotatably disposed between said upper horizontal side and said lower horizontal side of said stationary rail.

8. A locking slide apparatus according to claim 7, further including an elongated rail guide depending from said upper horizontal side of said stationary rail and coextensive with each longitudinal border of said slot, said rail guides being laterally disposed between said rollers to guide the longitudinal movement of said slide mechanism and minimize the lateral movement thereof.

9. A locking slide apparatus according to claim 7, further including a guide plate connected to said slide mechanism, said guide plate being substantially C-shaped to define, in cooperation with said elongated horizontal slide member of said slide mechanism, a guide hole through which said vertical member of said vertical lock mechanism is slidably guided.

10. A locking slide apparatus according to claim 8, wherein said upper horizontal side, said lower horizontal side, said two vertical sides and said rail guides of said stationary rail constitute one continuous piece.

11. A locking slide apparatus according to claim 7, further including at least one bracket connected to said horizontal slide member of said slide mechanism to secure the seat support thereto.

12. A locking slide apparatus according to claim 10, wherein said horizontal slide member, said vertical slide member and said bracket of said slide mechanism constitute one continuous piece.

13. A locking slide apparatus according to claim 6, wherein said lock mechanism includes a slide lock having a substantially I-shaped cross section defined by a vertical web connected to and extending between a horizontal upper flange and a horizontal lower flange, said horizontal lower flange having at least one lock pawl upwardly and vertically disposed thereon distal from said web.

14. A locking slide apparatus according to claim 13, wherein said slide lock includes a plurality of lock pawls upwardly and vertically disposed on said lower flange thereof, said lock pawls being spaced to be inserted in a respective plurality of lock holes in said upper horizontal side of said stationary rail at each of the seat positions.

15. A locking slide apparatus according to claim 14, further including:
a pair of side channels having substantially U-shaped cross sections, each of said side channels being connected, along its internal nadir line, to a respective one of said vertical slide members of said slide mechanism, along its lower edge; and
a central channel having a substantially U-shaped cross section, said central channel enveloping at least a portion of, and being connected to, each of said side channels, said lower flange of said slide lock being slidable enveloped within a central portion of said central channel to minimize any lateral and angular movement of said slide lock and being disposed between said side channels to minimize any longitudinal movement of said slide lock.

16. A locking slide apparatus according to claim 15, further including a lateral slide lock guide disposed on and extending vertically and upwardly from each lateral border of said lower flange of said slide lock.

17. A locking slide apparatus according to claim 16, wherein said lock pawls are disposed proximate to, and extend upwardly and vertically from, each longitudinal end of each lateral slide lock guide.

18. A locking slide apparatus according to claim 13, wherein said biasing means comprises a substantially helical compression spring disposed between said upper flange of said slide lock and said guide plate to resiliently urge said upper flange upwardly away from said guide plate and said lock pawl into a vertical lock hole in said upper horizontal side of said stationary rail.

* * * * *